United States Patent [19]

McGhie

[11] Patent Number: 4,926,282

[45] Date of Patent: May 15, 1990

[54] ELECTRIC CIRCUIT BREAKING APPARATUS

[75] Inventor: Terence V. McGhie, Blackburn, United Kingdom

[73] Assignee: BICC Public Limited Company, London, England

[21] Appl. No.: 206,103

[22] Filed: Jun. 13, 1988

[30] Foreign Application Priority Data

Jun. 12, 1987 [GB] United Kingdom ................. 8713791

[51] Int. Cl.[5] ................................................ H02H 3/08

[52] U.S. Cl. .................................... 361/102; 361/394; 335/18; 335/21; 335/155; 335/156; 335/201

[58] Field of Search .................... 361/2, 93, 94, 95, 96, 361/97, 102, 392, 393, 394; 335/18, 21, 59, 155, 156, 201

[56] References Cited

U.S. PATENT DOCUMENTS

| | | | |
|---|---|---|---|
| 4,333,122 | 6/1982 | Hayden et al. | 361/93 X |
| 4,530,024 | 7/1985 | Brody, Jr. | 361/93 X |
| 4,568,899 | 2/1986 | May et al. | 335/18 |
| 4,686,600 | 8/1987 | Morris et al. | 335/18 X |
| 4,754,162 | 6/1988 | Kondou et al. | 361/96 X |
| 4,780,787 | 10/1988 | Dano et al. | 361/96 X |
| 4,794,484 | 12/1984 | Matsko et al. | 361/93 |

*Primary Examiner*—Derek S. Jennings
*Attorney, Agent, or Firm*—Anthony J. Casella; Gerald E. Hespos

[57] ABSTRACT

An electric circuit breaker for protecting an electric circuit of an electrical installation of a building is of such a construction that a substantial proportion of its components are standard for the preferred current ratings of the breaker and that some components having a limited useful life can be readily replaced. The circuit breaker comprises a switching unit with a moulded case housing, fixed and movable contacts, a tripping mechanism and a manually operable dolly switch; an over-current release unit having a moulded case, separately formed with respect to the case of the switching unit, housing an electromagnetic device operatively mechanically coupled to the tripping mechanism and adapted to be electrically interconnected in a power circuit independent of the power circuit to be protected and a current sensor for continuously providing an output signal which is a function of the current flowing through the circuit to be protected, the switching and over-current release units being so detachably electrically connected that current which will flow through the circuit to be protected will flow through the switching unit; and, electrically connected to the current sensor, a microprocessor. The microprocessor can be so programmed that, in the event of a short circuit or sustained overload, a current is caused to flow through the independent power circuit to operate the electromagnetic device and thereby initiate operation of the tripping mechanism of the switching unit.

9 Claims, 2 Drawing Sheets

ELECTRIC CIRCUIT BREAKING APPARATUS

Figure 1:
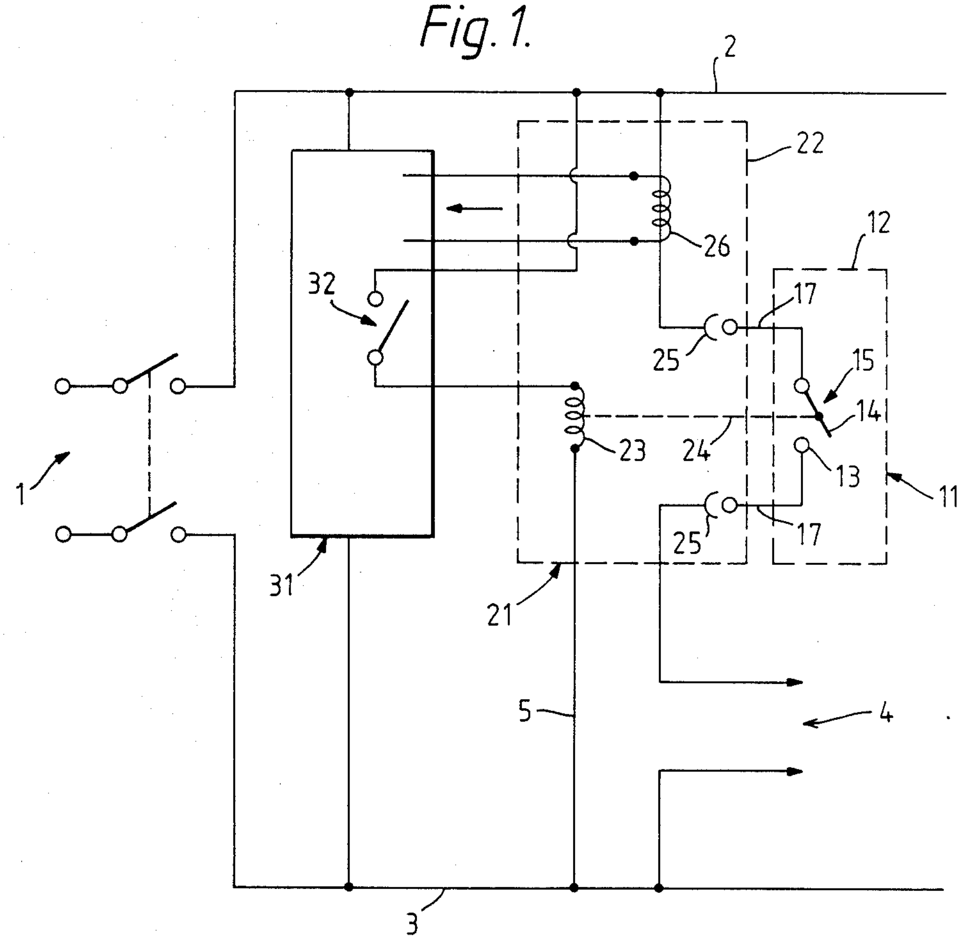

This invention relates to electric circuit breakers for making and breaking an electric circuit both in normal conditions and in abnormal conditions such as those of short circuit and sustained overload, in abnormal conditions the circuit being broken automatically. The invention is particularly concerned wit electric circuit breakers suitable for household and similar applications.

An electric circuit breaker currently in general use for household and similar applications includes an electromagnetic device which, on passage of a short circuit current through the circuit breaker, initiates the tripping operation of the circuit breaker and a thermal element which becomes heated upon passage of a current through the circuit breaker and which, upon a current of sustained overload (i.e. sustained passage of current in excess of the rated capacity of the breaker) initiates the tripping operation of the circuit breaker.

One form of electric circuit breaker used in household and similar applications has hitherto been known as a miniature electric circuit breaker. Miniature electric circuit breakers in accordance with British Standard Specification No. 3871, Part I, 1965 are classified into four Types according to their instantaneous tripping current, that is the minimum short circuit current at which the breakers shall trip electromagnetically with an opening time not exceeding 0.1 second. The instantaneous tripping current of each of these four Types of breaker is given in the following table as a function of $I_n$, the rated current of the circuit breaker.

| Type | Instantaneous Tripping Current (Amp) |
|---|---|
| 1 | $> 2.7\ I_n$ to $\leqq 4.0\ I_n$ |
| 2 | $> 4.0\ I_n$ to $\leqq 7.0\ I_n$ |
| 3 | $> 7.0\ I_n$ to $\leqq 10\ I_n$ |
| 4 | $> 10\ I_n$ to $\leqq 50\ I_n$ |

The rated current, $I_n$ of a miniature electric circuit breaker is the nominal current appropriate to the circuit which the breaker is designed to protect and, although current ratings are not standardised, British Standard Specification No. 3871, Part I, 1965 gives fifteen preferred values lying in the range 5 to 100 amps. Thus, each of Types 1, 2, 3 and 4 miniature electric circuit breakers can be designed to have any one of fifteen current ratings.

Although a proportion of the components of miniature electric circuit breakers of all four Types and of all the preferred current ratings are standard for all breakers, as a consequence of the different Types and different ratings of breaker that may be required, a manufacturer has to have readily available electromagnetic devices, thermal elements, contacts and other components peculiar to a particular Type and/or a particular current rating. The overall cost of miniature electric circuit breakers is therefore influenced to an undesirable extent by the multiplicity of different ratings of electromagnetic devices, thermal elements, contacts and other breaker components which a manufacturer has to keep in stock and by the expense which a manufacturer incurs in modifying the production procedure in respect of each breaker of a particular Type and particular current rating.

It is an object of the present invention to provide an improved electric circuit breaker for household and similar applications which is of such a construction that the proportion of components standard for the preferred current ratings of the breaker can be substantially increased and that components having a limited useful life, depending upon the number of times the breaker has broken an electric current in an abnormal condition, can be readily replaced.

According to the invention, the improved electric circuit breaker comprises a switching unit comprising a case of electrically insulating material housing a fixed contact and a movable contact, a tripping mechanism for causing the movable contact to move to the open or break position, and a manually operable spring-loaded dolly which protrudes through a wall of the case and which is operatively coupled to the tripping mechanism; an over-current release unit comprising a case of electrically insulating material, separately formed with respect to the case of the switching unit, housing an electromagnetic device which is detachably operatively mechanically coupled to the tripping mechanism of said switching unit and which is adapted to be electrically interconnected in a power circuit independent of the circuit to be protected and current sensing means for continuously providing an output signal which is a function of the current flowing through the circuit to be protected, said switching unit and said over-current release unit being so detachably electrically connected together that current which will flow through the circuit to be protected, or a predetermined proportion of said current, will flow through said switching unit; and, electrically connected to the current sensing means, a microprocessor which can be so programmed that, in the event of an over-current equal to or greater than a predetermined instantaneous tripping current or in the event of a sustained overload reaching a predetermined unacceptable value of current for a predetermined time or a predetermined unacceptable combination thereof, a current is caused to flow through said independent power circuit to operate the electromagnetic device and thereby initiate operation of the tripping mechanism of the switching unit.

Since operation of the electromagnetic device of the over-current release unit is initiated by a flow of current in a power circuit independent of the circuit to be protected, the electromagnetic device and the over-current release unit of which it forms a part can be standard for electric circuit breakers of all Types and of all the preferred current ratings. Furthermore, by arranging for all the component parts of the switching unit through which the current flowing in the circuit to be protected will pass to be capable of carrying the maximum of the range of current ratings. i.e. 100 amps, the switching unit can also be standard for electric circuit breakers of all Types and of all the preferred current ratings. Thus, the proportion of components standard for all four Types of electric circuit breaker and for all the preferred current ratings is substantially increased. Additionally, since the microprocessor continuously records and stores output signals of the current sensing means, the microprocessor effectively replaces the thermal element hitherto employed in electric circuit breakers for household and similar applications.

Moreover, since the switching unit and the over-current release unit are housed in separately formed cases of electrically insulating material and are detachably electrically connected together and the electromagnetic device of the over-current release unit is detachably operatively mechanically coupled to the tripping mechanism of the switching unit, the switching unit of the improved circuit breaker can be readily replaced when the limited useful life of some components of the switching unit has ended, depending upon the number of times the breaker has broken an electric circuit in an abnormal condition.

Accordingly, the invention also includes a kit of parts for assembling an electric circuit breaker, which kit of parts comprises a plurality of switching units substantially identical to one another, each of which switching units comprises a case of electrically insulating material housing a fixed contact and a movable contact, a tripping mechanism for causing the movable contact to move to the open or break position, and a manually operable spring-loaded dolly which protrudes through a wall of the case and which is operatively coupled to the tripping mechanism; an over-current release unit comprising a case of electrically insulating material, separately formed with respect to the case of each of said plurality of switching units, housing an electromagnetic device which can be detachably operatively mechanically coupled to the tripping mechanism of any one of said plurality of switching units and which is adapted to be electrically interconnected in a power circuit independent of the circuit to be protected and current sensing means for continuously providing an output signal which is a function of the current flowing through the circuit to be protected, any one of said switching units and the over-current release unit being adapted to be so detachably electrically connected together that current which will flow through the circuit to be protected, or a predetermined proportion of said current, will flow through said switching unit; and, for electrical connection to the current sensing means, a microprocessor which can be so programmed that, in the event of an over-current equal to or greater than a predetermined instantaneous tripping current or in the event of a sustained overload reaching a predetermined unacceptable value of current for a predetermined time or a predetermined unacceptable combination thereof, a current is caused to flow through said independent power circuit to operate the electromagnetic device and thereby initiate operation of the tripping mechanism of said switching unit.

Preferably, the switching unit is detachably secured to, or any one of the plurality of switching units can be detachably secured to, the over-current release unit solely by the detachable electrical connection therebetween. Preferably, also, the detachable electrical connection between the switching unit, or any one of the plurality of switching units, and the over-current release unit is a plug and socket connection. In this latter case, preferably the male contacts of the plug and socket connection protrude from the casing of the switching unit, or of each of the plurality of switching units.

The detachable operative mechanical coupling between the electromagnetic device of the over-current release unit and the tripping mechanism of the switching unit, or of any one of the plurality of switching units, preferably is a substantially rigid elongate member which can be caused to move through aligned holes in the case of the over-current release unit and in the case of the switching unit to initiate operation of the tripping mechanism of the switching unit.

The current sensing means of the over-current release unit may be any currently available sensing device which will continuously provide an output signal which is a function of the current flowing through a circuit to be protected. Likewise, the electromagnetic device of the over-current release unit may be a solenoid or an other of the electromagnetic devices currently employed in electric circuit breakers for household and similar applications.

Preferably, the tripping mechanism of the switching unit, or of each of the plurality of switching units, is of such a form that the fixed and movable contacts in the unit cannot be physically held closed against a fault in the circuit being protected. Preferably, also, the tripping mechanism of the switching unit, or of each of the plurality of switching units, is of such a form that, when the electric circuit breaker is used with one or more than one electric circuit breaker of a similar construction in multiple electric circuit breaking apparatus, the tripping mechanisms of the switching units of the breakers can be operatively coupled together to form an inter- tripping mechanism for ensuring complete isolation of the supply, in the event of an overload or fault on any phase.

The switching unit, or each of the plurality of switching units, preferably has an arc extinguishing device for quickly and effectively extinguishing any arc formed when breaking the circuit being protected. The arc extinguishing device may be any arc extinguishing device currently available and currently used in known electric circuit breakers.

The microprocessor can be any known microprocessor capable of performing the functions hereinbefore described and the selection of a known microprocessor suitable for incorporation in the electric circuit breaker of the present invention will be well within the abilities of any person skilled in this art. Likewise, programming of the microprocessor to control operation of the electric circuit breaker of the present invention will also be well within the abilities of any person skilled in this art.

Preferably, where two or more improved electric circuit breakers of the present invention are used in multiple electric circuit breaking apparatus and in consumer units, distribution boards and other arrangements, a single microprocessor may replace the microprocessors of said two or more improved electric circuit breakers and so service and be programmed for each of the plurality of switching units and associated over-current release units of the circuit breakers and the program for each switching unit and associated over-current release unit may differ from the program for each of one or more of the other switching units and associated over-current release units.

The microprocessor of the improved circuit breaker, or said single microprocessor servicing and being programmed for two or more switching units and associated over-current release units, may also constitute the automatic actuator of electric circuit contacting apparatus for making and breaking a circuit or circuits in accordance with a predetermined program, each contacting apparatus comprising a switching unit as hereinbefore described and a make/break unit comprising a case of electrically insulating material, separately formed with respect to the case of the switching unit, housing two electromagnetic devices, each independent of the other, one of which devices is adapted to be electrically interconnected in a power circuit independent of the circuit to be protected and is so operatively mechanically coupled to the tripping mechanism of the switching unit as to cause the movable contact to move to the open or break position when a current flows through said power circuit and the other of which devices is adapted to be electrically interconnected in another power circuit independent of the circuit to be protected and is so operatively mechanically coupled to the tripping mechanism of the switching unit as to cause the movable contact to move to the closed or make position when a current flows through said other power circuit.

The microprocessor of the improved electric circuit breaker, or said single microprocessor servicing and being programmed for two or more switching units and associated over-current release units, may also serve as an "intelligent unit" and be employed:

(i) to monitor and store information concerning the operation of the associated switching unit, or of each of said two or more switching units, under abnormal conditions to provide an indication when the switching unit has reached or is nearing the end of its useful life;

(ii) to monitor continuously and store the power used by the electric circuit or circuits being protected, and (iii) to serve as a program controller, e.g. of a central heating system and/or an air conditioning system.

The microprocessor may also include display means e.g. a screen or digital recorder, for continuously displaying the state, power or energy consumption or other information in respect of the or each electric circuit being protected.

Figure 2:
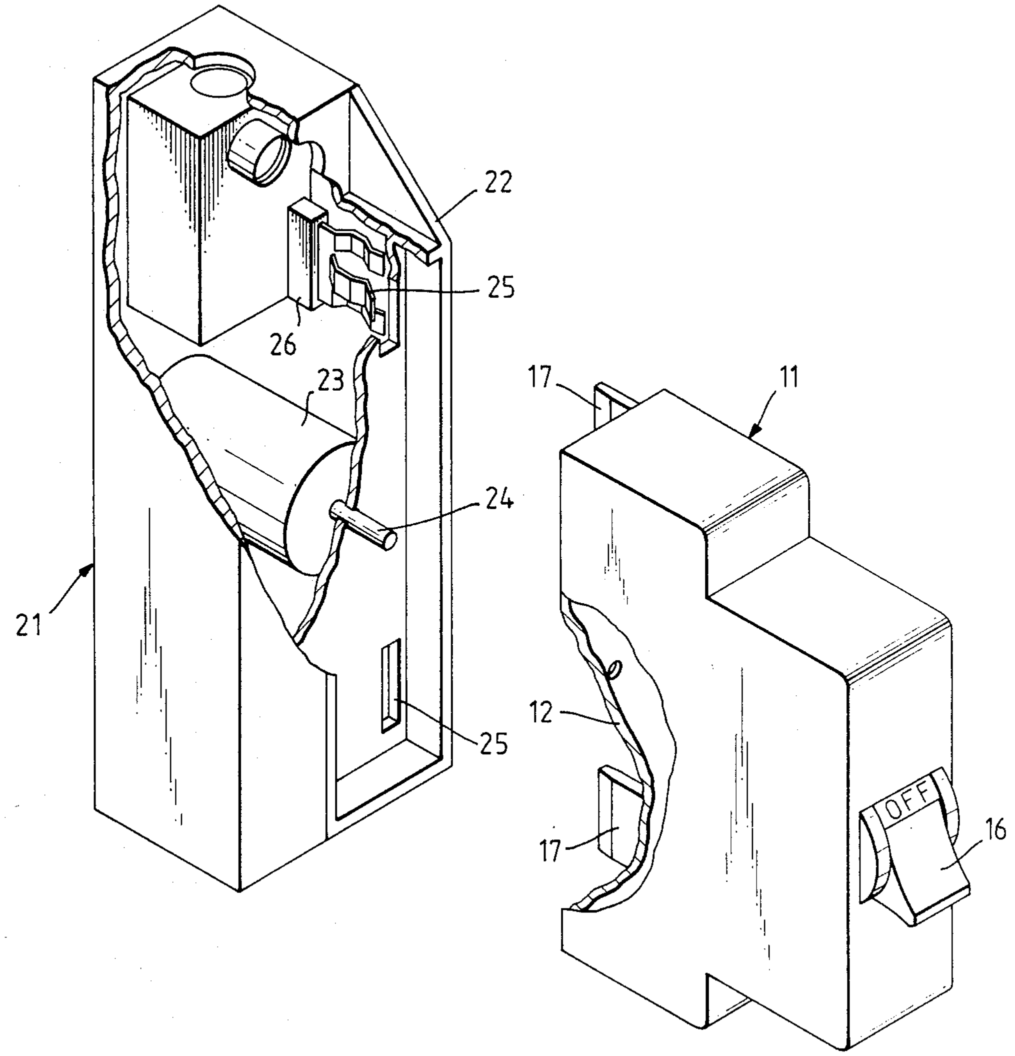

The invention is further illustrated by a description, by way of example, of a preferred electric circuit breaker for household and similar applications with reference to the accompanying drawings, in which:

FIG. 1 shows a schematic circuit diagram of the preferred electric circuit breaker, and FIG. 2 is a side view, partly in section and partly partly in elevation, of the switching unit and over-current release unit of the preferred electric circuit breaker.

Referring to the drawings, an electric circuit 4 which is to be protected by the improved circuit breaker is electrically interconnected between a line busbar 2 and a neutral busbar 3 fed from an electrical power supply 1.

The improved circuit breaker comprises three major components, namely a switching unit 11, an over-current release unit 21 and a microprocessor 31, all of which are separately formed with respect to one another. The switching unit 11 comprises a moulded case 12 of electrically insulating plastics material housing a fixed contact 13 and a movable contact 14 which are electrically connected to a pair of pins 17 which protrude through a wall of the case. Associated with and operatively coupled to the movable contact 14 is a tripping mechanism 15 for causing the movable contact to move to the open or break position and, protruding through a wall of the case 12 is a manually operable spring-loaded dolly 16 which is operatively coupled to the tripping mechanism.

The over-current release unit 21 comprises a moulded case 22 of electrically insulating plastics material which is separately formed with respect to the case 12 of the switching unit 11 and which houses an electromagnetic device 23, a pair of female sockets 25 and a current sensor 26. The electromagnetic device 23 is a solenoid which is electrically interconnected in a power circuit 5 which is independent of the circuit 4 to be protected and which extends between the line busbar 2 and the neutral busbar 3. Associated with the electromagnetic device 23 is a rod 24 which can be caused to move through aligned holes in the case 22 of the over-current release unit 21 and the case 12 of the switching unit 11 to operate the tripping mechanism 15. The pair of socket contacts 25 are electrically interconnected in the circuit 4 to be protected and are adapted to be engaged by the pins 17 of the switching unit 11 by means of which the switching unit can be electrically connected to and detachably secured on the over- current release unit 21. The current sensor 26 continuously provides an output signal which is a function of the current flowing through the circuit 4 and which is fed to the microprocessor 31 electrically interconnected between the line busbar 2 and the neutral busbar 3. The microprocessor 31 controls the flow of current through the power circuit 5 via a switch 32.

The microprocessor 31 is so programmed that, in the event of an overcurrent in the circuit 4 equal to or greater than a predetermined instantaneous tripping current or in the event of a sustained overload in the circuit 4 reaching a predetermined unacceptable value of current for a predetermined time or a predetermined unacceptable combination thereof, the switch 32 closes and a current is caused to flow through the power circuit 5 to operate the electromagnetic device 23 and so cause the rod 24 to initiate operation of the tripping mechanism 15 of the switching unit 11 and so cause the movable contact 14 to move to the open or break position.

The electromagnetic device 23 and the over-current release unit 21 of which it forms a part can be standard for electric circuit breakers of all Types and of all the preferred current ratings. All the component parts of the switching unit 11 through which the current flowing in the circuit 4 will pass are capable of carrying 100 amps and so the switching unit is standard for electric circuit breakers of all Types and of all preferred current ratings. As a consequence, the proportion of components standard for all four Types of electric circuit breaker and for all the preferred current ratings is increased.

Since the switching unit 11 and the over-current release unit 21 are housed in separately formed moulded plastics cases 12 and 22 respectively and are detachably electrically connected together by the plug and socket connection 17/25 and the electromagnetic device 23 is detachably operatively mechanically coupled to the tripping mechanism 15 by the rod 24, the switching unit 11 can be readily replaced when the limited useful life of some of its components has ended, which life will depend upon the number of times the breaker has broken the circuit 4 in an abnormal condition.

What I claim as my invention is:

1. An electric circuit breaker for protecting an electric circuit of an electrical installation of a building, which circuit breaker comprises a switching unit comprising a case of electrically insulating material housing a fixed contact and a movable contact, a tripping mechanism for causing the movable contact to move to the break position, and a manually operable spring-loaded dolly which protrudes through a wall of the case and which is operatively coupled to the tripping mechanism; an over-current release unit comprising a case of electrically insulating material, separately formed with respect to the case of the switching unit, housing an electromagnetic device which is detachably operatively mechanically coupled to the tripping mechanism of said switching unit and which is adapted to be electrically interconnected in a power circuit independent of the circuit to be protected and current sensing means for continuously providing an output signal which is a function of the current flowing through the circuit to be protected, said switching unit and said over-current release unit being so detachably electrically connected together that at least a predetermined proportion of current which will flow through the circuit to be protected will flow through the switching unit; and, electrically connected to the current sensing means, a microprocessor which can be so programmed that, in the event any one of an over-current at least equal to a predetermined instantaneous tripping current, a sustained overload reaching a predetermined unacceptable value of current for a predetermined time and a predetermined unacceptable combination thereof, a current is caused to flow through said independent power circuit to operate the electromagnetic device and thereby initiate operation of the tripping mechanism of the switching unit.

2. An electric circuit breaker as claimed in claim 1, wherein said switching unit and said over-current release unit are detachably secured together solely by the detachable electrical connection therebetween.

3. An electric circuit breaker as claimed in claim 1, wherein the detachable electrical connection between said switching unit and said over-current release unit is a plug and socket connection.

4. An electric circuit breaker as claimed in claim 3, wherein the male contacts of the plug and socket connection protrude from the casing of said switching unit.

5. An electric circuit breaker as claimed in claim 1, wherein the detachable operative mechanical coupling between the electro- magnetic device of the over-current release unit and the tripping mechanism of the switching unit is a substantially rigid elongate member which can be caused to move through aligned holes in the case of the over-current release unit and in the case of the switching unit to initiate operation of the tripping mechanism of the switching unit.

6. An electric circuit breaker as claimed in claim 1, wherein the tripping mechanism of the switching unit is of such a form that the fixed and movable contacts cannot be physically held closed against a fault in the circuit being protected.

7. An electric circuit breaker as claimed in claim 1, wherein the tripping mechanism of the switching unit is of such a form that, when the electric circuit breaker is used with at least one electric circuit breaker of a similar construction in multiple electric circuit breaking apparatus, the tripping mechanisms of the switching units of the breakers can be operatively coupled together to form an inter-tripping mechanism for ensuring complete isolation of the supply.

8. A switching unit for use in an electric circuit breaker for protecting an electric circuit of an electrical installation of a building, and for use with an over-current release unit comprising a case of electrically insulating material separately formed with respect to the switching unit, the over-current release unit having electrical contacts therein, said switching unit comprising a case of electrically insulating material housing a fixed contact and a movable contact, a tripping mechanism for causing the movable contact to move to a break position, a manually operable spring-loaded dolly which protrudes through a wall of the case of the switching unit and which is operatively coupled to the tripping mechanism, and the switching unit further including electric contacts suitable for effecting detachable electrical connection with the electric contacts of the over-current release unit.

9. An over-current release unit for use in an electric circuit breaker for protecting an electrical circuit of an electrical installation of a building, said circuit breaker comprising a switching unit having a case of electrically insulating material housing a fixed contact and a movable contact and a tripping mechanism for causing the movable contact to move to the break position, said over-current release unit comprising a case of electrically insulating material separately formed with respect to the case of said switching unit, housing an electromagnetic device which can be detachably operatively mechanically coupled to the tripping mechanism of said switching unit and which electro-mechanical device is adapted to be electrically interconnected in a power circuit independent of the circuit to be protected, current sensing means for continuously providing an output signal which is a function of the current flowing through the circuit to be protected, and, for inter-connection in the circuit to be protected, electric contacts for effecting detachable electrical connection with the electric contacts of said switching unit.

* * * * *